Sept. 9, 1969     C. A. JAMES ET AL     3,466,086

BICYCLE SADDLE SUPPORT MEANS

Filed July 18, 1967     3 Sheets-Sheet 1

INVENTOR.
CARL A. JAMES
JOHN R. MILLER

John R. Walker, II
Attorney

Sept. 9, 1969 C. A. JAMES ET AL 3,466,086
BICYCLE SADDLE SUPPORT MEANS
Filed July 18, 1967 3 Sheets-Sheet 2

INVENTOR.
CARL A. JAMES
JOHN R. MILLER
John R. Walker, III
Attorney

Sept. 9, 1969    C. A. JAMES ET AL    3,466,086
BICYCLE SADDLE SUPPORT MEANS
Filed July 18, 1967    3 Sheets-Sheet 3
FIG. 8
FIG. 9
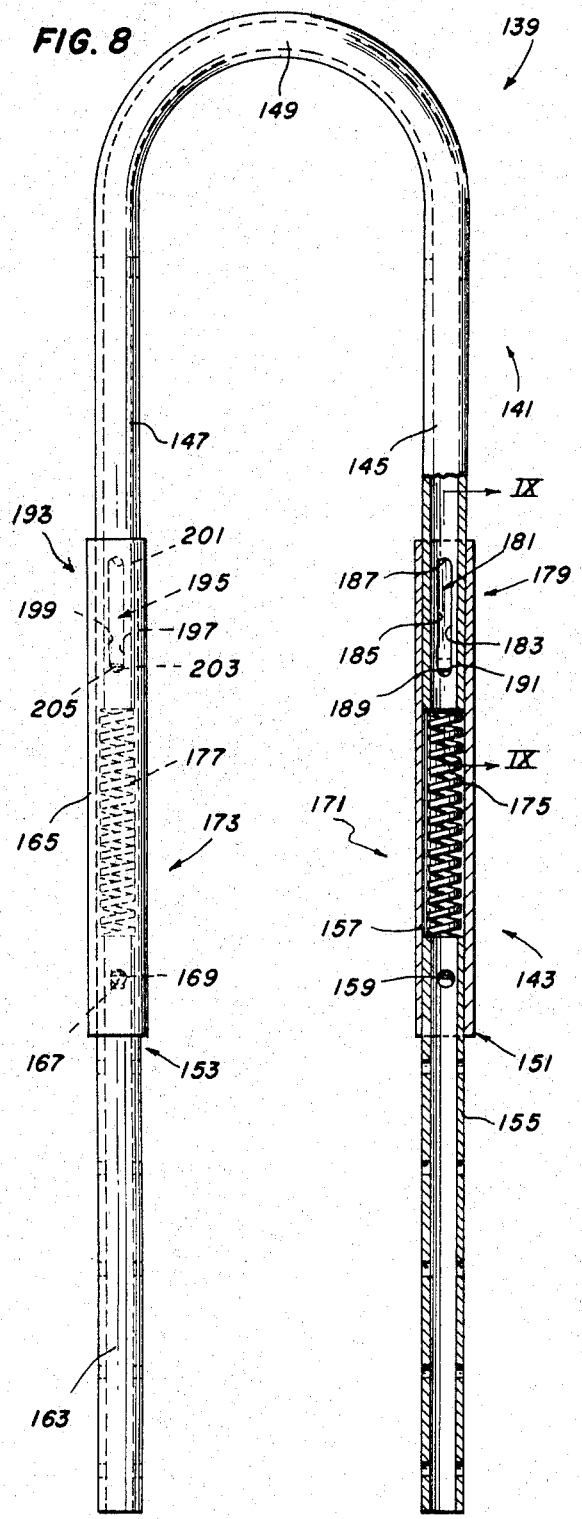
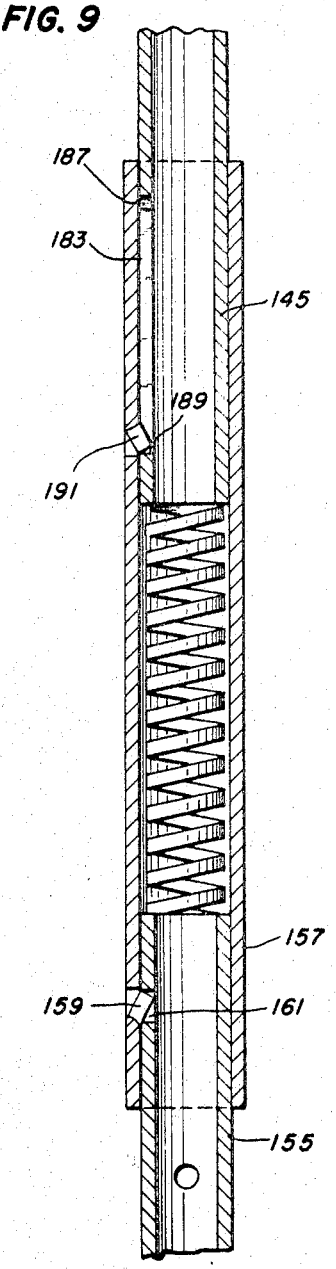
INVENTORS
CARL A. JAMES
JOHN R. MILLER
John R. Walker, III
attorney United States Patent Office 3,466,086
Patented Sept. 9, 1969

3,466,086
BICYCLE SADDLE SUPPORT MEANS
Carl A. James and John R. Miller, Bolivar, Tenn., assignors to Troxel Manufacturing Company, Moscow, Tenn.
Continuation-in-part of application Ser. No. 640,860, May 24, 1967. This application July 18, 1967, Ser. No. 654,238
Int. Cl. B62j 1/02; B62k 19/00; B60g 11/14
U.S. Cl. 297—209                                    12 Claims

ABSTRACT OF THE DISCLOSURE

Support means for supporting an elongated bicycle saddle or seat adjacent the forward and rearward ends thereof. The portion of the support means which is adjacent the forward end of the saddle having pivot means for attaching the forward end of said saddle to the post of the bicycle. The portion of the support means which is adjacent the rearward end of the saddle having an inverted U-shaped brace means including a pair of legs which are respectively of telescopic construction and have spring means therein.

CROSS-REFERENCES TO RELATED APPLICATIONS

This application is a continuation-in-part of our copending application, Ser. No. 640,860, filed May 24, 1967 (now abandoned).

BACKGROUND OF THE INVENTION

Field of the invention

Supports for elongated bicycle seats of the "Banana Seat" type.

Description of the prior art

Previous supports for bicycle seats of the above-mentioned type have had rigid rearward supports which have held the seat substantially rigid against any up and down pivoting movement so that many times the rider experienced discomfort, particularly when going over bumps.

SUMMARY OF THE INVENTION

The present invention is directed towards overcoming the heretofore-mentioned and other disadvantages in prior supports for elongated bicycle seats or saddles. One of the objects of the present invention is to provide support means for a saddle of the above-mentioned type which will permit a unique pivoting action of the saddle in which the rearward end of the saddle can be made to pivot up and down about a horizontal pivot axis adjacent the front of the saddle. A concept of the present invention is to provide pivot means for attaching the forward end of the saddle to the usual post of the bicycle and to provide an inverted U-shaped rearward support means which includes telescopically mounted legs including sleeves having springs therein so that a "springy action" is provided the rider. Another feature of the present inventon is to provide an additional spring mount beneath the bicycle seat to give additional spring support and comfort to the rider.

A further object is to provide an alternate embodiment in which the additional spring is omitted, and the seat adjacent the forward end thereof is pivoted directly on the bicycle post.

A further object is to provide an alternate embodiment in which the upper portion of the rear support includes an integrally formed bight portion having a pair of downwardly projecting legs into which a lower pair of legs are telescopically mounted with springs acting between the bight portion and the lower pair of legs. An additional feature of the present invention is to provide smooth action of the telescoping parts by having the springs therein of square cross-section with the ends of the springs being flat and in planes perpendicular to the axes of the springs.

A further object is to provide an alternate embodiment in which the parts of the rear support have means interposed therebetween for permitting telescopic movement yet preventing disengagement of the parts.

DESCRIPTION OF THE DRAWINGS

FIG. 8 is an elevational view of an alternate embodiment of the rear support means with parts broken away for purposes of illustration.

FIG. 9 is an enlarged sectional view taken as on the line IX—IX of FIG. 8.

DESCRIPTION OF THE PREFERRED EMBODIMENTS

Figure 1:
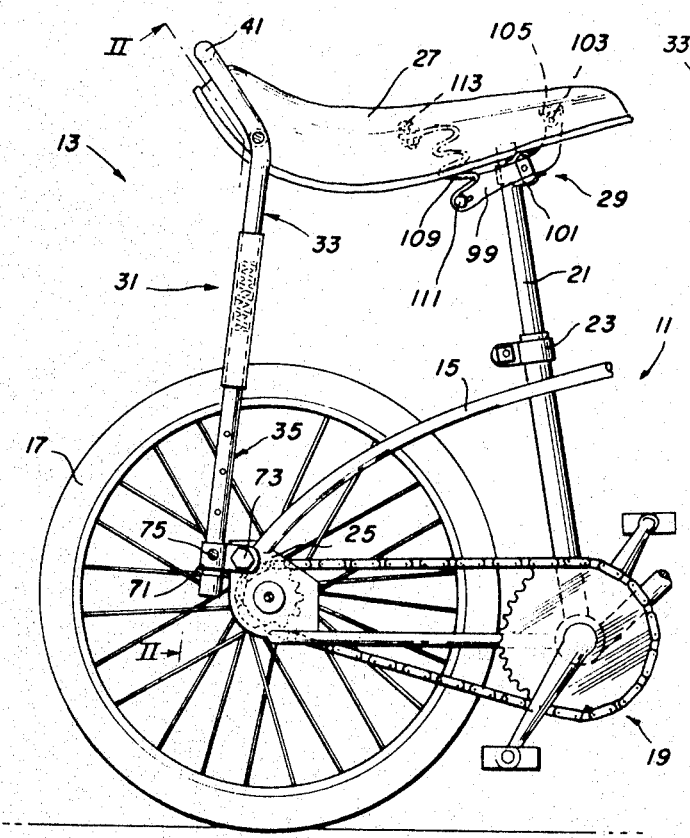
FIG. 1 is a fragmentary view of the rearward portion of a bicycle incorporating the support means of the present invention therein.

A typical bicycle 11 with which the support means 13 of the present invention is adapted to be used is best shown in FIG. 1 wherein it will be seen the bicycle 11 includes the usual frame 15, rear wheel 17, and drive mechanism 19 for the rear wheel. In addition, bicycle 11 includes the usual adjustable post 21 which is adjustably clamped or mounted on the frame 15 by the usual clamp 23. Additionally, bicycle 11 includes the usual support structure 25 on either side of rear wheel 17 adjacent the central portion thereof and which is usually in the form of vertically extending plates that are part of the frame 15. The elongated seat or saddle 27 with which the support means 13 of the present invention is used and adapted to support is that well known type of seat which the assignee of the present invention and others presently manufacture and which said assignee refers to its seat by the trademark "Banana Seat." Thus, when the term "elongated bicycle saddle" or "elongated bicycle seat" is used in the present application, it is deemed to mean that particular type of seat or saddle illustrated and others similar to it and which is referred to by the name "Banana Seat," among other names. The following is a description of the present invention and its relationship to the heretofore-described bicycle 11 and seat 27.

Figure 2:
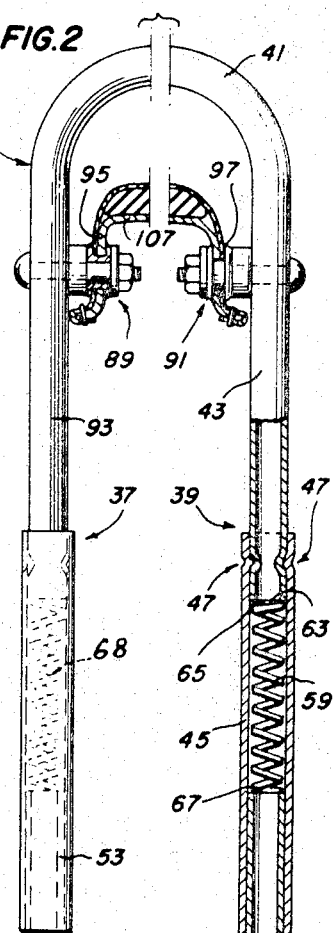
FIG. 2 is an enlarged sectional view taken as on the line II—II of FIG. 1 and with parts broken away for purposes of illustration.
Figure 4:
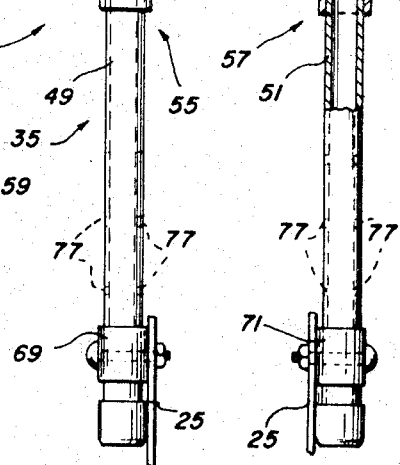
FIG. 4 is a cross sectional view of one of the turns of one of the springs incorporated in the present invention.

Referring first to the embodiment of FIGS. 1 and 2, the support means 13 comprises in general a forward support means or assembly 29 and a rearward support means or assembly 31. Referring first to rearward support assembly 31, it includes an upper portion 33 and a lower portion 35. Upper portion 33 comprises a pair of depending legs 37, 39 integrally interconnected adjacent the upper ends thereof by a bight portion 41. Legs 37, 39 are of identical construction, and the following description of leg 39 will suffice for both. Leg 39 is preferably of two-piece construction and includes an upper tubular portion 43 which is the portion of leg 39 that is integrally formed with the bight portion 41 and is preferably the same diameter as the tubular bight portion. In addition, leg 39 includes a sleeve 45 which has its upper end fitted over the lower end of upper tubular portion 43 in telescopic fashion and is fastened rigidly thereto by deforming the metal as at 47. Lower portion 35 includes a pair of tubular legs 49, 51 whose upper ends are respectively telescopically and slidably received in the lower ends of sleeve 53 of leg 37 and sleeve 45 of leg 39. It will be understood that sleeve 53 is of the same construction as sleeve 45 and corresponds thereto. Also, it will be understood that the above-described telescopic engagement of lower legs 49, 51 with upper legs 37, 39 provide corresponding pairs 55, 57 of the upper and lower legs. A compression sping 59 is interposed between upper leg 39 and lower leg 51 for resiliently supporting the upper leg from the lower leg. The spring 59 is preferably of special construction as will be described hereinafter and is disposed in sleeve 45 with the upper end 63 thereof seated against the lower end 65 of tubular portion 43 and with the lower end 67 seated against the upper end of leg 51, as best seen in FIG. 2. The spring 59 is preferably square in cross section, as best seen in FIG. 4. The upper end 63 of the spring is formed so that it is flat or lying in a plane perpendicular to the axis of the spring 59, and the lower end 67 is also flat or lying in a plane perpendicular to the axis of the spring so that during relative movement of legs 39, 51, the spring 59 will not bind, as might otherwise occur if the spring were round in cross section and the ends were not flat. Another spring 68, which corresponds to spring 59, is preferably provided between upper leg 37 and lower leg 49.

Lower legs 49, 51 are attached to the frame 15 of the bicycle by suitable means adjacent the center of rear wheel 17. The preferred form of this attachment is shown in FIGS. 1 and 2 wherein it will be seen clips 69, 71 respectively adjustably attach legs 49, 51 to the support structure 25 of the bicycle as by the bolt-nut fastener means 73 which extend through aligned apertures in the clips and the support structure 25, and by bolt-nut fastener means 75, which extend through aligned apertures in the clips and selected ones of the pairs of aligned apertures 77 in legs 49, 51 to give the desired height. This is the type of attachment shown and claimed in the copending application, Ser. No. 598,815, filed Dec. 2, 1966, for "Support Means for a Saddle" and further details may be had by referring thereto. If desired, other means of attachment may be provided to attach legs 49, 51 to the bicycle without departing from the spirit and scope of the present invention. For example, clips may be provided for use with legs which do not have the multiplicity of apertures therein but instead the clips embrace the legs tightly without bolt-nut fastener means. Also, if desired, the type of attachment shown in FIG. 3 may be utilized, wherein it will be seen the lower end of the leg 79 which corresponds to leg 51 is flattened at the lower end thereof as at 81 and a plurality of apertures 83 are provided therethrough. Instead of poviding a clip, the flattened end 81 is attached to the same axle 85 which is the axle of rear wheel 17 to hold the leg 79 in place. Thus, the axle 85 extends through one of the apertures 83 in the flattened end 81 and is secured thereto by means of the nut 87.

The upper portion 33 of rearward support means 31 is attached to seat 27 adjacent the rearward end of the seat by suitable means as bolt-nut fastener means 89, 91 respectively extending through the upper tubular portion 93 of leg 37, which corresponds to upper tubular portion 43, and through upper tubular portion 43, and then respectively through the depending opposite sides 95, 97 of seat 27, as best seen in FIG. 2.

The forward support means or assembly 29 preferably includes a bracket means 99 of suitable type which is fixedly and adjustably rigidly secured to post 29 by suitable means as a typical clamp 101. In addition, the forward support means 29 includes a suitable pivot means connection between seat 27 and stationary bracket means 99, such as pivot pin 103 extending through the forward end of bracket means 99 and through a lug 105 which in turn is fixedly attached to the base member 107 of the seat 27 adjacent the forward end thereof. Auxiliary compression springs 109 which are preferably two in number, although only one is shown, extend between the rearward end of bracket means 99 and base member 107 with the springs being respectively attached thereto as by the fasteners 111, 113. It will be understood that the other one of the springs 109, which cannot be seen in FIG. 1, is in the same position on the opposite side of the seat of the one shown. In other words, the springs 109 are in typical fashion, one on one side of the bicycle seat and one on the opposite side. If desired, however, one of the springs 109 may be omitted and the one remaining preferably placed along the center line of the seat 27.

Figure 5:
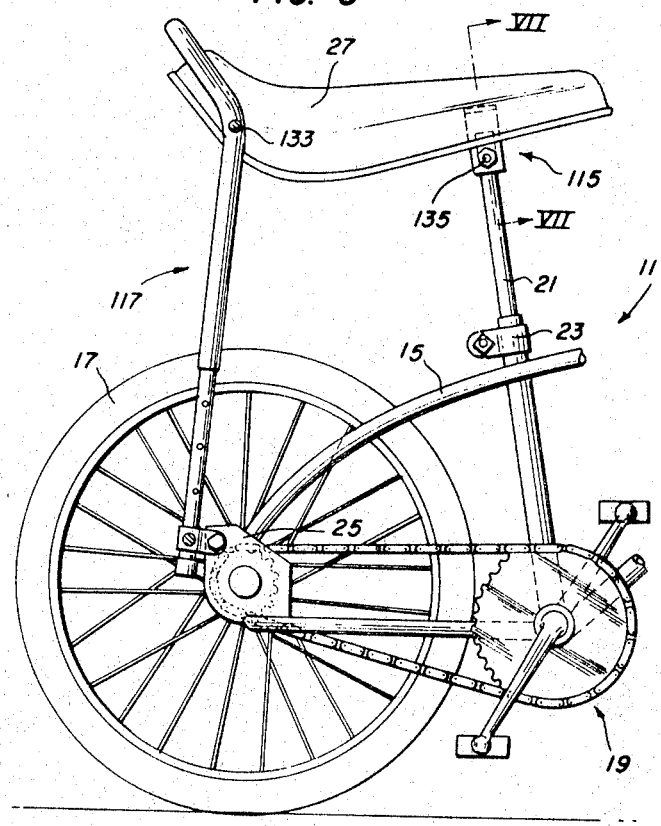
FIG. 5 is a view similar to FIG. 1 showing an alternate embodiment of the present invention.
Figure 6:
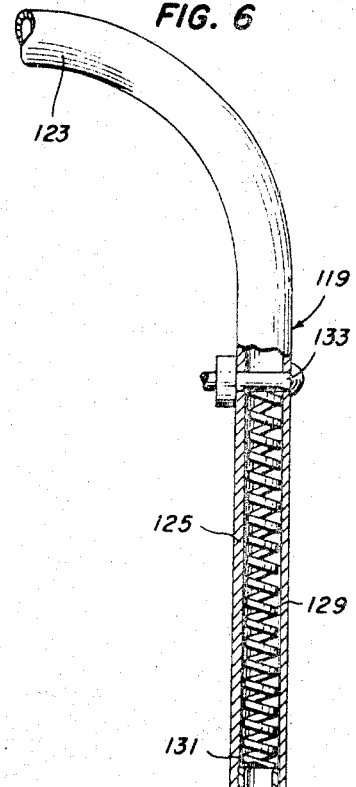
FIG. 6 is a view similar to FIG. 2 of the alternate embodiment of FIG. 5, but only showing one-half of the support.
Figure 7:
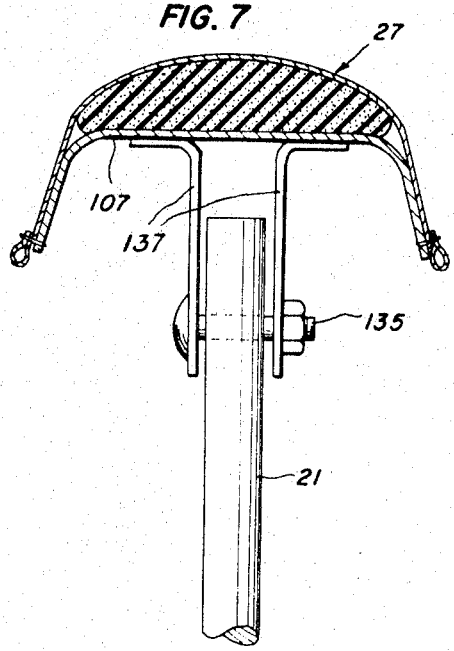
FIG. 7 is an enlarged sectional view taken as on the line VII—VII of FIG. 5.
Figure 7:
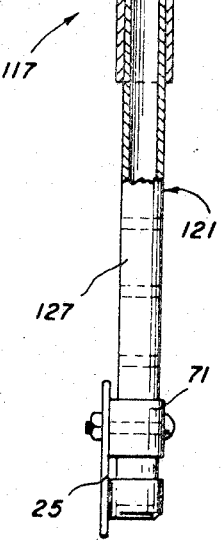

Referring now to FIGS. 5-7 which show an alternate embodiment of the present invention, the environment is the same as in the preferred embodiment and the same numbers are used to indicate the parts of the bicycle 11 which are the same. However, the forward support means or assembly 115 and the rearward support means or assembly 117 which correspond respectively with the forward support means 29 and rearward support means 31, are different or modified somewhat from the preferred embodiment, as will be better understood in the following description.

Figure 3:
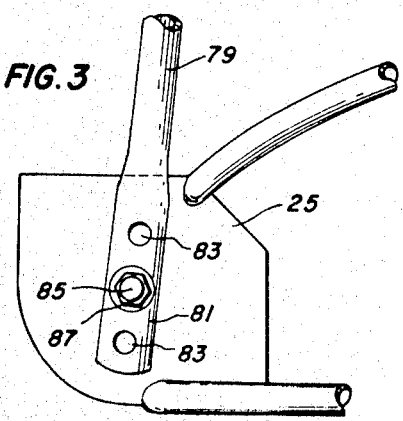
FIG. 3 is an enlarged fragmentary view of an alternate means of attaching the support to the bicycle.

Referring first to rearward support means 117, it comprises an upper portion 119 and a lower portion 121. Lower portion 121 is substantially identical to lower portion 35 of the preferred embodiment and is attached to the frame 15 of the bicycle by any suitable means, as for example, those heretofore described relative to the preferred embodiment or as shown in FIG. 3. The upper portion 119, however, is modified and different from the upper portion 33 in that upper portion 119 is not provided with a sleeve but rather is of integral construction. Thus, upper portion 119 is in the form of a tube bent to establish a bight portion 123 and depending upper leg portions 125 into which the lower legs 127 (which correspond with legs 49, 51 of the preferred embodiment) are slidably and telescopically received. It will be understood that in FIG. 6 only one-half of the rearward support means 117 is shown but that the opposite half is of identical construction. In other words, the rearward support means 117 in its complete form is in the shape of an inverted U as is the preferred embodiment of rearward support means 31 and as viewed in FIG. 2.

A spring 129 which is of similar construction to spring 59 of the preferred embodiment, but is somewhat longer, extends between the upper end 131, as shown in FIG. 6, of leg 127 to the bolt-nut fastener means 133 that fastens the upper portion 119 to the seat 127. It will be understood that another spring 129, not shown, is provided in the opposite leg 125, not shown, in the same manner as depicted in FIG. 6 for the righdthand leg 125.

Forward support means 115 is somewhat different from forward support means 29 of the preferred embodiment in that there are no auxiliary springs such as springs 109 but only pivot means. Thus, forward support means 115 is pivoted directly on post 21 as by means of the bolt-nut fastener means 135 extending through aligned apertures in post 21 and bracket means, preferably in the form of angle members 137 that are respectively fixedly attached to base member 107 of seat 27, as best seen in FIG. 7.

Referring now to FIGS. 8 and 9 which show an alternate embodiment of the rearward support means or assembly 139, the environment is the same as in the preferred embodiment. However, rearward support means 139 has been modified somewhat from rearward support means 31 and rearward support means 117. Rearward support means 139 comprises an upper portion 141 and a lower portion 143. Upper portion 141 comprises a pair of depending legs 145, 147 integrally interconnected adjacent the uper ends thereof by a bight portion 149. Lower portion 143 comprises a pair of upstanding legs 151, 153. Legs 151, 153 are of identical construction and the following description of leg 151 will suffice for both. Leg 151 is preferably of two-piece construction and includes a lower tubular portion 155 and a sleeve 157 which has its lower end fitted over the upper end of lower tubular portion 155 in telescopic fashion and is fastened rigidly thereto by providing a projection 159 on sleeve 157 which projects inwardly into an aperture 161 provided in lower tubular portion 155. Leg 153 is similarly constructed and includes a lower tubular portion 163, a sleeve 165, a projection 167 and an aperture 169 which respectively correspond to lower tubular portion 155, sleeve 157, projection 159 and aperture 161.

The lower ends of legs 145, 147 are respectively telescopically and slidably received in the upper ends of sleeves 157, 165 to provide corresponding pairs 171, 173 of the upper and lower legs. A compression spring 175 is provided in sleeve 157 and interposed between upper and lower legs 145, 151. The spring 175 is preferably of the same special construction as heretofore described relative to spring 59. The lower end of spring 175 is seated against the upper end of tubular portion 155 and the upper end of the spring is seated against the lower end of leg 145. Another spring 177 is provided in sleeve 165 and interposed between upper leg 147 and lower leg 153 in a similar manner as described relative to compression spring 175.

Coupling means 179 is interposed between leg 145 and sleeve 157 for preventing separation of leg 145 from sleeve 157 and yet permits sliding movement of leg 145 in sleeve 157. Coupling means 179 preferably comprises a slot 181 extending longitudinally in leg 145 adjacent the lower end thereof. Slot 181 is defined by the parallel wall portions 183, 185 of leg 145 that define the sides of the slot 181 and the portions 187, 189 of the leg 145 that define respectively the upper and lower ends of the slot 181. Coupling means 179 additionally includes a projection 191 provided on sleeve 157 and which projection extends inwardly into slot 181 to guide the movement of leg 145 relative to sleeve 157 and to prevent separation of leg 145 from sleeve 157.

A coupling means 193 is interposed between leg 147 and sleeve 165 for the same purpose as coupling means 179. Coupling means 193 is similar in construction and arrangement to coupling means 179 and thus includes a slot 195 defined by sides 197, 199 and ends 201 and 203, which correspond respectively to slot 181, sides 183, 185 and ends 187, 189. In addition, coupling means 193 includes a projection 205 which corresponds to projection 191 and extends into slot 195.

It will be understood that the forward support means 115 and 29 may be used interchangeably with the rearward support means 31, 117 and 139 without departing from the spririt and scope of the present invention. In other words, forward support means 115 may be used with rearward support means 31, 117 or 139 and forward support means 29 may be used with rearward support means 31, 117 or 139. Regardless of the particular combination used, the rider of the bicycle will experieince a "springy action" and the rearward end of the seat 27 will pivot up and down about the forward pivot means. This will given the rider a unique action as well as a very comfortable ride.

We claim:
1. In a bicycle of the type including an elongated saddle, including a post beneath said saddle, and including structure adjacent the center of the bicycle wheel; the improvement comprising forward support means including pivot means for attaching said saddle adjacent the forward end thereof to said post, an inverted U-shaped rearward support means interposed between said saddle adjacent the rearward end thereof and said structure adjacent the center of the bicycle wheel for movably supporting the rearward end of said saddle, said rearward support means including an upper portion attached to said saddle and a lower portion attached to said structure adjacent the center of the bicycle wheel, said upper portion including a pair of legs, said lower portion including a pair of legs respectively telescopically slidably engaged with said pair of legs of said upper portion to provide corresponding pairs of said upper and lower legs, a pair of spring means respectively interposed between the upper and lower leg of each of said corresponding pairs for resiliently supporting said upper legs from said lower legs, one of said legs of each of said corresponding pair including a sleeve slidably mounted over the other of said legs of each of said corresponding pair and in which sleeve a said spring means is mounted, coupling means being interposed between said sleeve and said other of said legs for preventing separation of said other of said legs and said sleeve and yet permitting sliding movement thereof.

2. In a bicycle of the type including an elongated saddle, including a post beneath said saddle, and including structure adjacent the center of the bicycle wheel; the improvement comprising forward support means including pivot means for attaching said saddle adjacent the forward end thereof to said post, an inverted U-shaped rearward support means interposed between said saddle adjacent the rearward end thereof and said structure adjacent the center of the bicycle wheel for movably supporting the rearward end of said saddle, said rearward support means including an upper portion attached to said saddle and a lower portion attached to said structure adjacent the center of the bicycle wheel, said upper portion including a pair of legs, said lower portion including a pair of legs respectively telescopically slidably engaged with said pair of legs of said upper portion to provide corresponding pairs of said upper and lower legs, a pair of spring means respectively interposed between the upper and lower leg of each of said corresponding pairs for resiliently supporting said upper legs from said lower legs, one of said legs of each of said corresponding pair including a sleeve slidably mounted over the other of said legs of each of said corresponding pair and in which sleeve a said spring means is mounted, coupling means being interposed between said sleeve and said other of said legs for preventing separation of said other of said legs and said sleeve and yet permitting sliding movement thereof, said coupling means comprising means defining a slot extending longitudinally in said other of said legs, and projection means on said sleeve extending into said slot for sliding movement therein to guide the movement of said other of said legs relative to said sleeve and for abutting said means defining said slot at the end thereof to prevent separation of said other of said legs from said sleeve.

3. In a bicycle of the type including an elongated saddle, including a post beneath said saddle, and including structure adjacent the center of the bicycle wheel; the improvement comprising forward support means including pivot means for attaching said saddle adjacent the forward end thereof to said post, an inverted U-shaped rearward support means interposed between said saddle adjacent the rearward end thereof and said structure adjacent the center of the bicycle wheel for movably supporting the rearward end of said saddle, said rearward support means including an upper portion attached to said saddle and a lower portion attached to said structure adjacent the center of the bicycle wheel, said upper portion including a pair of legs, said lower portion including a pair of legs respectively telescopically slidably engaged with said pair of legs of said upper portion to provide corresponding pairs of said upper and lower legs, a pair of spring means respectively interposed between the upper and lower leg of each of said corresponding pairs for resiliently supporting said upper legs from said lower legs, said forward support means including bracket means fixedly attached to said post and auxiliarly spring means interposed between said saddle and said bracket means, and in which said pivot means is interposed between said bracket means and said saddle.

4. In a bicycle of the type including an elongated saddle, including a post beneath said saddle, and including structure adjacent the center of the bicycle wheel; the improvement comprising forward support means including pivot means for attaching said saddle adjacent the forward end thereof to said post, an inverted U-shaped rearward support means interposed between said saddle adjacent the rearward end thereof and said structure adjacent the center of the bicycle wheel for movably supporting the rearward end of said saddle, said rearward support means including an upper portion attached to said saddle and a lower portion attached to said structure adjacent the center of the bicycle wheel, said upper portion including a pair of legs, said lower portion including a pair of legs respectively telescopically slidably engaged with said pair of legs of said upper portion to provide corresponding pairs of said upper and lower legs, a pair of spring means respectively interposed between the upper and lower leg of each of said corresponding pairs for resiliently supporting said upper legs from said lower legs, each of said spring means being square in cross section and having flat ends perpendicular to the axis thereof.

5. In a bicycle of the type including an elongated saddle, including a post beneath said saddle, and including structure adjacent the center of the bicycle wheel; the improvement comprising forward support means including pivot means for attaching said saddle adjacent the forward end thereof to said post, an inverted U-shaped rearward support means interposed between said saddle adjacent the rearward end thereof and said structure adjacent the center of the bicycle wheel, for movably supporting the rearward end of said bicycle saddle, said rearward support means including an upper portion attached to said saddle and a lower portion attached to said structure adjacent the center of the bicycle wheel, said upper portion including a pair of legs, said lower portion including a pair of legs respectively telescopically slidably engaged with said pair of legs of said upper portion to provide corresponding pairs of said upper and lower legs, said forward support means including bracket means fixedly attached to said post and compression spring means interposed between said saddle and said bracket means, said pivot means being interposed between said bracket means and said saddle.

6. The apparatus of claim 5 in which is provided a pair of spring means respectively interposed between the upper and lower legs of each of said corresponding pair for resiliently supporting said upper legs from said lower legs.

7. The apparatus of claim 6 in which one of said legs of each of said corresponding pair includes a sleeve slidably mounted over the other of said legs of each of said corresponding pair and in which sleeve a said spring means is mounted.

8. The apparatus of claim 7 in which said support means includes a bight portion integrally connecting said upper legs.

9. The apparatus of claim 6 in which each of said spring means is square in cross section and has flat ends perpendicular to the axis thereof.

10. A rearward support means for supporting the rearward end of a bicycle seat from a bicycle comprising an upper portion for attachment to the bicycle seat and a lower portion for attachment to the bicycle, said upper portion including a pair of legs, said lower portion including a pair of legs respectively telescopically slidably engaged with said pair of legs of said upper portion to provide corresponding pairs of said upper and lower legs, one of said legs of each of said corresponding pair including a tubular portion and a sleeve slidably mounted in telescoping relationship with the other of said legs of each of said corresponding pair, said tubular portion being mounted in telescoping relationship with said sleeve, means fixedly coupling said tubular portion to said sleeve, said tubular portion and said other of said legs being of the same diameter, and coupling means interposed between said sleeve and said other of said legs for preventing separation of said other of said legs and said sleeve and yet permiting sliding movement thereof.

11. The rearward support means of claim 10 in which spring means is mounted concentrically relative to said sleeve and interposed between the end of said tubular portion and the end of said other of said legs.

12. The rearward support means of claim 11 in which said coupling means comprises means defining a slot extending longitudinally in said other of said legs, and projection means on said sleeve extending into said slot for sliding movement therein to guide the movement of said other of said legs relative to said sleeve and for abutting said means defining said slot at the end thereof to prevent separation of said other of said legs from said sleeve.

References Cited

UNITED STATES PATENTS

| D. 200,753 | 3/1965 | Ryan | D90—8 |
|---|---|---|---|
| 603,735 | 5/1898 | Porter | 248—402 X |
| 1,717,056 | 6/1929 | Mesinger | 248—402 X |
| 2,168,148 | 8/1939 | Archart. | |
| 2,316,436 | 4/1943 | Kalter | 297—209 X |
| 3,258,290 | 6/1966 | Karbin | 297—195 |

FOREIGN PATENTS

| 122,112 | 1/1919 | Great Britain. |
|---|---|---|
| 141,949 | 11/1948 | Australia. |
| 1,014,785 | 6/1952 | France. |

OTHER REFERENCES

American Bicyclist and Motrocyclist Magazine; July 1966, p. 9.

KENNETH H. BETTS, Primary Examiner

U.S. Cl. X.R.

280—283, 287; 267—60